Lorna R. Braget
INVENTOR.

BY *Clarence A. O'Brien*
and *Harvey B. Jacobson*
Attorneys

United States Patent Office 3,552,840
Patented Jan. 5, 1971

3,552,840
EYEGLASS FRAME CONSTRUCTION FOR REMOVABLE LENSES
Lorna R. Braget, P.O. Box 59, Bagley, Minn. 56621
Filed Sept. 16, 1968, Ser. No. 759,841
Int. Cl. G02c 5/00
U.S. Cl. 351—154                    3 Claims

ABSTRACT OF THE DISCLOSURE

Readily changeable eyeglass lenses, more particularly, a frame with lens mounting rims having inward surfaces rabbeted to provide grooves each having a ledge-like lens seating and backing flange. Each groove functions to lodge the compressibly resilient molding therein. Top and bottom portions of the molding are respectively provided with a lens piloting and retaining lip-like guard and a row of pliant ear-like detents which can be flexed at will. The user can pop out the lenses and snap them in place in a selectively usable alternate frame. One set of lenses can be used in highly decorative frames of unique shapes, colors and design to harmonize with apparel and costume jewelry.

---

The present invention relates to spectacles and eyeglasses and has to do with a unique concept wherein a single pair of lenses can be safely and quickly removed from the mounting rims on one pair of eyeglasses and aptly and acceptably transferred for use to correspondingly constructed mounting rims embodied in other eyeglasses which, while basically alike, are strikingly colorfully different in design and appearance.

Persons conversant with the field of invention hereinafter disclosed are aware that many women dislike wearing glasses but eventually do so when they realize that they can adopt the current practice of owning and using eyeglasses which harmonize and are in keeping with ever changing apparel and variegated costume jewelry and appropriate ornaments. The above fad involves the ownership of numerous pairs of ready-to-wear eyeglasses and spectacles and can be and often is objectionably expensive. It follows that it is an object of the present invention to so construct the lens mounting rims of all of the owned eyeglasses so that a single pair or set of prescribed lenses can be optionally pushed out of their rims and then inserted and snapped into place in like or correspondingly constructed mounting rims expressly provided for exchange purposes. Accordingly, a single pair of lenses can be economically used in conjunction with any reasonable number of extra ornamentally distinct eyeglasses.

For purposes of simplicity of presentation of the present disclosure, a typical pair of eyeglasses is shown and is exemplary of the over-all multipurpose aspect and will serve to comprehend the nature of the inventive idea, namely, the manner in which the lens mounting rims are constructed to accommodate a pair of insertable and removable lenses.

Briefly the one-piece moldable or equivalent frame is characterized by a pair of basically similar coplanar lens mounting rims having inner adjacent ends joined by a nose bridge and provided at their outer ends with hingedly or correspondingly mounted temples. The obverse face or front side will be of the general contour and configuration shown. In actual practice the factors of delineation, color, size and surface ornamentation will vary in keeping with prevailing fads and styles, this being of incidental character insofar as the essence of the invention is mounting rim is molded or rabbeted to define an appropriately shaped lens seating groove. One component of the groove constitutes a ledge-like lens-abutting, seating and localizing flange. The insert which borders and is lodged in the groove is herein set forth as an endless strip of molding. This molding is conformingly seated and retentively lodged in the groove and the inner peripheral edge is designed and adapted to encompass the oriented marginal edge of the readily insertable and removable lens. Actually the molding provides a gasket-like receiver and retainer for the lens. An upper median edge portion of the molding is provided with an elongate depending flange which serves as a piloting guard and retainer for the portion of the lens which is overlapped thereby. The diametrically opposite median portion of the lengthwise lower part of the molding is scalloped, that is, provided with a row of coplanar pliant pressure-responsive ears which serve as detents and which, in a manner to be described, facilitate the steps of plugging the lens in place and subsequently removing it for the aforementioned change purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
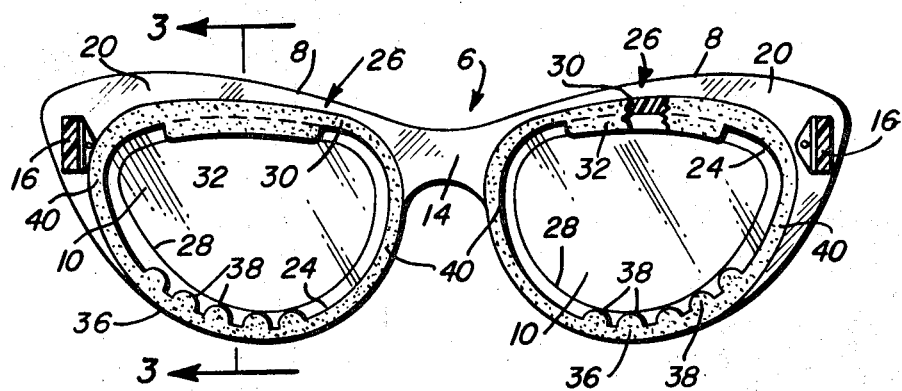
FIG. 2 is a rear view with portions appearing in section and wherein the featured improvements are shown.
Figure 3:
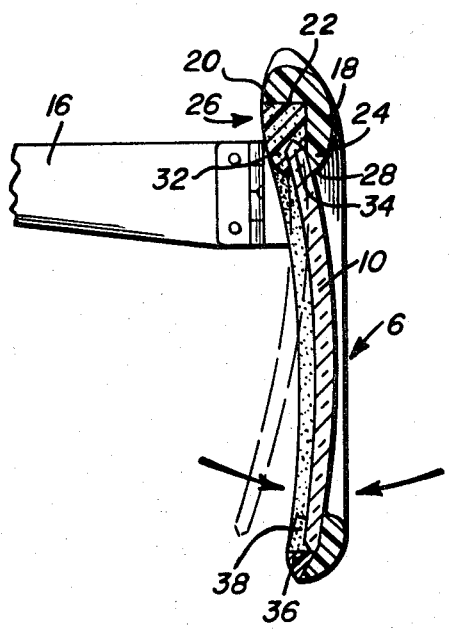

And FIG. 3 is an enlarged section taken approximately on the plane of the vertical line 3—3 of FIG. 2 looking in the direction of the arrows.

Figure 1:
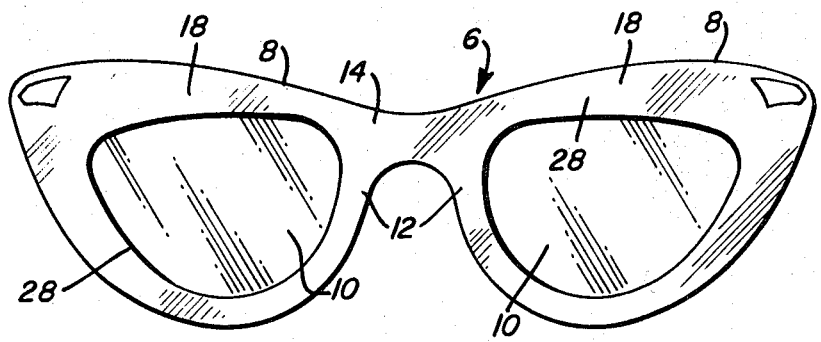
FIG. 1 is a front elevational view of a pair of eyeglasses or spectacles constructed in accordance with the invention and which from a structural point of view appears to be more or less conventional in nature.

With reference now to the several figures, it will be seen that the numeral 6 designates the aforementioned frame embodying coplanar companion hard plastic ring-like or equivalent rims 8 for the readily insertable and removable eyeglass lenses 10. The inner adjacent end portions 12 (FIG. 1) have upper components joined by a connecting nose bridge 14. The hingedly mounted temples are denoted at 16 (FIGS. 2 and 3). The substantially flat outward or obverse surfaces of the rims are denoted at 18 and the inward or rearward surfaces are denoted at 20 (FIG. 2). Each structurally and functionally improved lens mounting and retaining rim is the same in construction and a description of one will suffice for both. With reference to FIG. 2 it will be evident that that portion of the surface which borders or encircles the lens opening is provided with a rabbeted recess of requisite depth denoted, generally construed, by the numeral 22. A particular feature of the thus formed groove or recess is designated as a lens abutting and seating as well as positioning flange 24. This flange is of the endless form or construction best shown in FIG. 2. The complemental compressibly resilient plastic insert or ring-like molding 26 and is fitted and anchored in the groove and may be adhesively or in any feasible manner applied and anchored in place. It will be noted that the surfaces of the flange which provide a seating ledge for the cooperating surface of the molding are genreally flat as suggested in FIG. 3. The transverse cross-section of the annular or ring-like molding is non-circular and will vary in dimension. The surfaces thereof which are backed by the flange 24 are firm and substantially flat or sloped as suggested at the upper and lower portions in FIG. 3. In any event the over-all gasket-like molding is seated and retained with requisite nicety as is evident from FIGS. 2 and 3. The flange 24 from end to end is of a greater width or cross-sectional dimension than the molding so that the extreme inner peripheral edge portion 28 (FIG. 3) projects beyond the adjacent inner peripheral edges of the encompassed molding. The upper lengthwise portion 30 of the molding is of suitable shape and curvature and the median inward edge portion is provided with an appropriately elongated piloting and retaining lip, as at 32. This lip can be of comparatively hard material and it is spaced so as to provide a channel for that portion 34 (FIG. 3) of the lens which is held captive thereby. The diametrically opposite lower longitudinal portion 36 has a marginal edge provided with a row of longitudinally spaced semicircular scallop-like pliant detents 38 which serve as pressure-responsive retaining lugs and which cooperate in the manner shown in full and phantom lines in FIG. 3. The transverse connecting end portions 40 are denoted at the left and right hand ends in FIG. 2. The varying and relative cross-sectional dimensions of the flange and endless molding serve to accommodatingly receive and removably hold the lens 10 in place when desired.

Frames of the type shown may be manufactured simply by injecting a molding combining compatible hard and soft materials such as two densities of nylon. Non-compatible materials could be employed by using moldings and adhesives. The lens receiving groove may be a little larger than normal frames marketed today. This enables the lenses to be inserted and removed more quickly and easily. Because of the non-slippery quality of most soft materials the lenses will not move within the frames.

The manner in which the lens is inserted and removed is shown in full and phantom lines in FIG. 3 and hence a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. A pair of eyeglasses comprising a frame made of moldable but rigid self-shape-retaining plastic material and embodying a pair of like lens mounting rims each rim having an outward obverse side and an inward reverse side, the latter having an endless inner peripheral rabbet defining a lens seating groove and an encompassing ledge-like lens abutting, seating and localizing flange, an insertable endless strip of molding, said molding being made of compressibly resilient material and conformingly seated and retentively lodged in said groove and having a lens encompassing inner peripheral gasket-like edge spaced from an adjacent free edge portion of said flange, a readily insertable and removable lens spanning the lens opening of said rim and having a marginal outward surface seated on a coacting supporting surface of said flange and its marginal edge snugly encompassed by said molding and supported and retained in place by said molding, and wherein the suporting surface of said flange is substantially flat, said molding being non-circular in transverse cross-section and of a cross-sectional dimension less than the cross-sectional dimension of said flange whereby the free edge of the flange projects beyond the inner peripheral surface of said molding to the degree necessary to reliably back and seat the aforementioned marginal surface of said lens.

2. The eyeglasses defined in and according to claim 1, and wherein said molding is substantially ovate in elevation and embodies (1) an upper longitudinal portion having a major median portion provided with a firm but bendable depending lip-like lens piloting and retaining guard behind which an edge portion of the lens is nested and held in a given position (2) a lower longitudinal portion and (3) complemental transverse end portions integrally uniting the respective ends of the longitudinal portions, the median portion of said lower longitudinal portion having a row of coplanar bendably resilient upstanding lobe-like lens positioning and holding detents, said detents being normally straight but pressure responsive in a manner to facilitate inserting and removing said lens.

3. A pair of eyeglasses comprising a frame made of rigid self-shape-retaining plastic material and embodying a pair of like lens mounting rims each rim having an outward obverse side and an inward reverse side, the latter having an endless inner peripheral rabbet defining a lens seating groove and an encompassing ledge-like lens abutting, seating and localizing flange, an endless strip of compressibly resilient molding conformingly seated and retentively lodged in said groove, said molding being substantially ovate in elevation and embodying (1) an upper longitudinal portion having a major median portion provided with a firm depending relatively long lip-like lens piloting, overhanging and retaining guard behind which a substantial edge portion of the lens can be nested and removably held in a given position (2) a lower longitudinal portion and (3) complemental transverse end portions integrally uniting the respective ends of the longitudinal portions, the median portion of said lower longitudinal portion being scalloped and providing a row of coplanar bendably resilient upstanding lobe-like lens positioning and holding detents, said detents being normally straight but bendably pliant in a manner to facilitate manually inserting and removing said lens.

References Cited

FOREIGN PATENTS

| 959,284 | 12/1947 | France | 351—86 |
| 358,948 | 1962 | Switzerland | 351—86 |

DAVID SCHONBERG, Primary Examiner

J. W. LEONARD, Assistant Examiner

U.S. Cl. X.R.

351—86